United States Patent
Hagedorn

(10) Patent No.: US 9,112,384 B2
(45) Date of Patent: Aug. 18, 2015

(54) ARRANGEMENT AND METHOD FOR AVOIDING STRAY CURRENTS IN WIND POWER PLANTS

(75) Inventor: Ralf Hagedorn, Holdorf (DE)

(73) Assignee: AREVA Wind GmbH, Bremerhaven (DE)

( * ) Notice: Subject to any disclaimer, the term of this patent is extended or adjusted under 35 U.S.C. 154(b) by 0 days.

(21) Appl. No.: 14/126,525

(22) PCT Filed: Jun. 18, 2012

(86) PCT No.: PCT/EP2012/061569
§ 371 (c)(1),
(2), (4) Date: Mar. 13, 2014

(87) PCT Pub. No.: WO2012/172101
PCT Pub. Date: Dec. 20, 2012

(65) Prior Publication Data
US 2014/0183864 A1    Jul. 3, 2014

(30) Foreign Application Priority Data
Jun. 17, 2011  (EP) .................................. 11170387

(51) Int. Cl.
*H02J 11/00*  (2006.01)
*H02J 3/38*   (2006.01)
*F03D 9/00*   (2006.01)

(52) U.S. Cl.
CPC .............. *H02J 11/00* (2013.01); *F03D 9/003* (2013.01); *H02J 3/386* (2013.01); *Y02E 10/763* (2013.01)

(58) Field of Classification Search
CPC ................................ H02J 3/386; F03D 9/003
USPC ............................................ 290/44, 55
See application file for complete search history.

(56) References Cited

U.S. PATENT DOCUMENTS

| 5,825,170 A | 10/1998 | Montreuil |
| 7,830,031 B2 * | 11/2010 | Helle et al. ..................... 290/44 |
| 2005/0184751 A1 | 8/2005 | Hobelsberger et al. |

FOREIGN PATENT DOCUMENTS

| CN | 101083403 | 12/2007 |
| DE | 19742622 | 4/1999 |
| WO | 2007107158 | 9/2007 |
| WO | 2012172101 | 12/2012 |

OTHER PUBLICATIONS

International Search Report and Written Opinion mailed Nov. 26, 2012 in International Application No. PCT/EP2012/061569.

(Continued)

*Primary Examiner* — Tho D Ta
(74) *Attorney, Agent, or Firm* — Plumsea Law Group, LLC

(57) ABSTRACT

The invention relates to a method and an arrangement for avoiding stray currents in a wind power plant. There is an insulating power source having a galvanic decoupled secondary side, an electrical load coupled to the secondary side of the insulating power source through an electrical conductor and a stray current sensitive mechanical component of the wind power plant. The insulating power source is located at a first side of the stray current sensitive mechanical component and the load is located at a second side of the stray sensitive mechanical component. The electrical conductor is coupled to a common ground potential at the second side.

8 Claims, 2 Drawing Sheets

(56) References Cited

OTHER PUBLICATIONS

International Preliminary Report on Patentability (including Written Opinion of the ISA) mailed Jan. 3, 2014 in International Application No. PCT/EP2012/061569.

Chinese Office Action dated Nov. 26, 2014 in Chinese Patent Application No. 201280040119.0.

* cited by examiner

ARRANGEMENT AND METHOD FOR AVOIDING STRAY CURRENTS IN WIND POWER PLANTS

FIELD OF THE INVENTION

The invention relates to an arrangement for avoiding stray currents in a wind power plant, a corresponding method.

BACKGROUND

Fault currents or stray currents in complex power networks are hardly completely avoided. They can occur as stray currents, for example at electronic filters or as fault currents due to insulation deficiencies of the electronic equipments. Systems using grounded power networks in which the neutral point or neutral conductor are grounded have a particularly high risk of producing fault currents. A connection between the network and ground is usually provided close to the power source in order to keep the resistance between the network and ground small. The fault current will then return to the power source through the potential equalization system. As all current conduction parts of a facility have to be included in the potential equalization system, it is unavoidable that fault or stray currents flow through these conducting components. In accordance with the specific construction of the facilities, fault or stray currents may also flow through bearings or other mechanical devices thereby causing damages in these stray current sensitive mechanical parts. Another risk resides in the electrochemical corrosion of structure parts caused by the stray current. One possibility to avoid damages in mechanical parts consists in implementing the power network as an isolated IT-network. However, IT-networks have the disadvantage that first order insulation errors usually remain undiscovered, as no fault currents occur. In case of a first insulation error, the ground potential is equal to the fault voltage and dangerous situations can occur. Only a second insulation error might trigger the protective devices, as for example a fuse. In order to detect a first insulation error, insulation error detection systems have to be implemented which are expensive and complex.

A second possibility consists in implementing the network as a locally limited network. This provides that fault currents can only occur within a limited area. Fault currents are still not completely eliminated, but currents through sensitive mechanical components can be avoided through an adequate layout or arrangement of the facility. However, this requires implementing subsystems. The power source is then arranged close to the subsystem. If the power source is then supplied by a separate grounded network, fault currents can still occur.

A third possibility consists in providing specific current paths parallel to the mechanical parts. This is usually done by sliding contacts. However, the amount of fault current that may flow through the sliding contacts instead of the mechanical parts depends on the ratio of the impedances. Studies have shown that the impedance of mechanical parts is very often low enough to let fault currents still flow through the mechanical parts.

One attempt to avoid stray currents through mechanical parts in a wind power plant is known from WO 2007/107158 A1. This solution consists in placing two ground connections (one of which only provides an AC current path) on both sides of the driving shaft of the wind power plant.

SUMMARY

It is an object of the invention to provide an assembly or arrangement and a method for avoiding stray currents in a wind power plant that is less complex and more reliable than the known solutions.

In a first aspect of the invention, an assembly or arrangement for avoiding stray currents in a wind power plant is provided. The assembly/arrangement comprises an insulating power source having a galvanic decoupled secondary side. The secondary side is then the output of the insulating power source (sometimes also referred to as floating output). There is an electrical load coupled to the secondary side of the insulating power source. There is an electrical conductor between the secondary side of the insulating power source and the electrical load. The electrical conductor is arranged so as to bypass a stray current sensitive mechanical component of the wind power plant. The insulating power source is located at the first side of the stray current sensitive mechanical component. The load is located at a second side of the stray current sensitive mechanical component. The electrical conductor is coupled (or connected) to a common ground potential at the second side. The insulating power source has a primary side. The primary side is also coupled (or connected) to a common ground potential at the first side. The common ground potential of the first side and the common ground potential of the second side may be the same ground potentials of the wind power plant to which all electrically conducting parts of the wind power plant are connected. This aspect of the invention surprisingly provides that fault currents return to the power source only through the electrical conductor. Stray currents through the stray current sensitive component of the wind power plant are avoided.

The insulating power source can be or comprise an insulating transformer for providing an insulated (galvanic decoupled) output at the secondary side of the insulating power source. The primary side of the insulating transformer can be coupled to an external power grid. The external power grid can be grounded.

The first side may be any location within the nacelle of the wind power plant. Preferably, the first side is a non rotating part of the wind power plant. The second side may then be located in the hub of the wind power plant. In particular, the second side can be located in a rotating part of the wind power plant.

In an aspect of the invention, the load may then be a pitch drive of the wind power plant. Modern wind energy plants provide control of power and rotor speed by changing the aerodynamic force that is applied to the rotor. Usually, this is performed by changing the pitch of the rotor blades. Typically, the pitch drive comprises an electric motor that is mounted to a suitable gear e.g. an epicyclic gear having a high gear ratio. A drive bevel that is mounted to the driven (output) shaft of the epicyclic gear typically engages an annular gear or tooth ring that is fixed to the rotor blade.

It is particularly advantageous if the insulating power source is not arranged in the rotating parts (for example the hub) of the wind power plant. The nacelle is a preferable location for the insulating power source due to better environmental conditions within the nacelle and larger space. Furthermore, the accessibility in the nacelle is superior to the hub.

The ground potential at the second side is the same ground potential as the one used for the first side. This means that all parts, also the parts to which the conductor is connected at the second side are coupled to the same ground potential. However, even in this situation the current flows through the electrical conductor instead of flowing through the stray sensitive parts of the wind power plant, as for example the bearing of the hub.

The insulating power source may provide an AC or DC supply voltage at the secondary side.

The invention also provides a wind power plant comprising an insulating power source arranged in the nacelle. An electrical load can then be arranged in the hub. The electrical load may be one or more pitch drives for driving the blades of the wind power plant. The insulating power source may then be arranged on a first side of a stray currents sensitive mechanical part. The stray currents sensitive mechanical part may be a mechanical part between rotating and non-rotating parts of the wind power plant. The stray currents sensitive mechanical part can be the bearing of the hub of the wind power plant. The electrical load, i.e. the pitch drive, can then be located on a second side. This second side can be in the rotating hub. The insulating power source and the electrical load are connected through electrical conductors. The electrical conductor may comprise an electrical cable and one or more sliding contacts. The electrical conductor (electrically) bypasses the stray currents sensitive mechanical part. A ground connection is then provided between the electrical conductor (one of the conductors, i.e. the ground connection) and the second side. This electrical connection between common ground and the electrical conductor may advantageously be close to the electrical load (pitch drives).

Furthermore, the invention provides a wind park comprising wind power plants being configured in accordance with aspects of the invention.

The invention also provides a method for avoiding stray currents in a wind power plant. An insulating power source may then be arranged at a first location in the wind power plant. An electrical load may be provided at a second location in the wind power plant. The first and the second location may be at opposite sides of a stray currents sensitive mechanical part as, for example a bearing. This can be a bearing between rotating and non rotating parts of the wind power plant. The stray current sensitive mechanical part can be the bearing of the hub of the wind power plant. The secondary side of the insulating power source (also referred to as the floating output) may then be connected through an electrical conductor to the electrical load. This may be performed by using cables and sliding contacts bypassing the stray current sensitive mechanical part. Finally, the electrical conductor may be connected to a second side in order to provide a ground connection at the second side. Another ground connection may be provided at the primary side of the insulating power source. The ground potential at the first side (at the nacelle) and the ground potential at the second side (in the hub or more specifically in the tip of the hub) may be the same common ground potential to which all electrically conducting parts of the wind power plant are connected.

BRIEF DESCRIPTION OF DRAWINGS

Further aspects and characteristics of the invention will ensue from the following description of preferred embodiments of the invention with reference to the accompanying drawings, wherein.

DETAILED DESCRIPTION OF PREFERRED EMBODIMENTS

Figure 1:
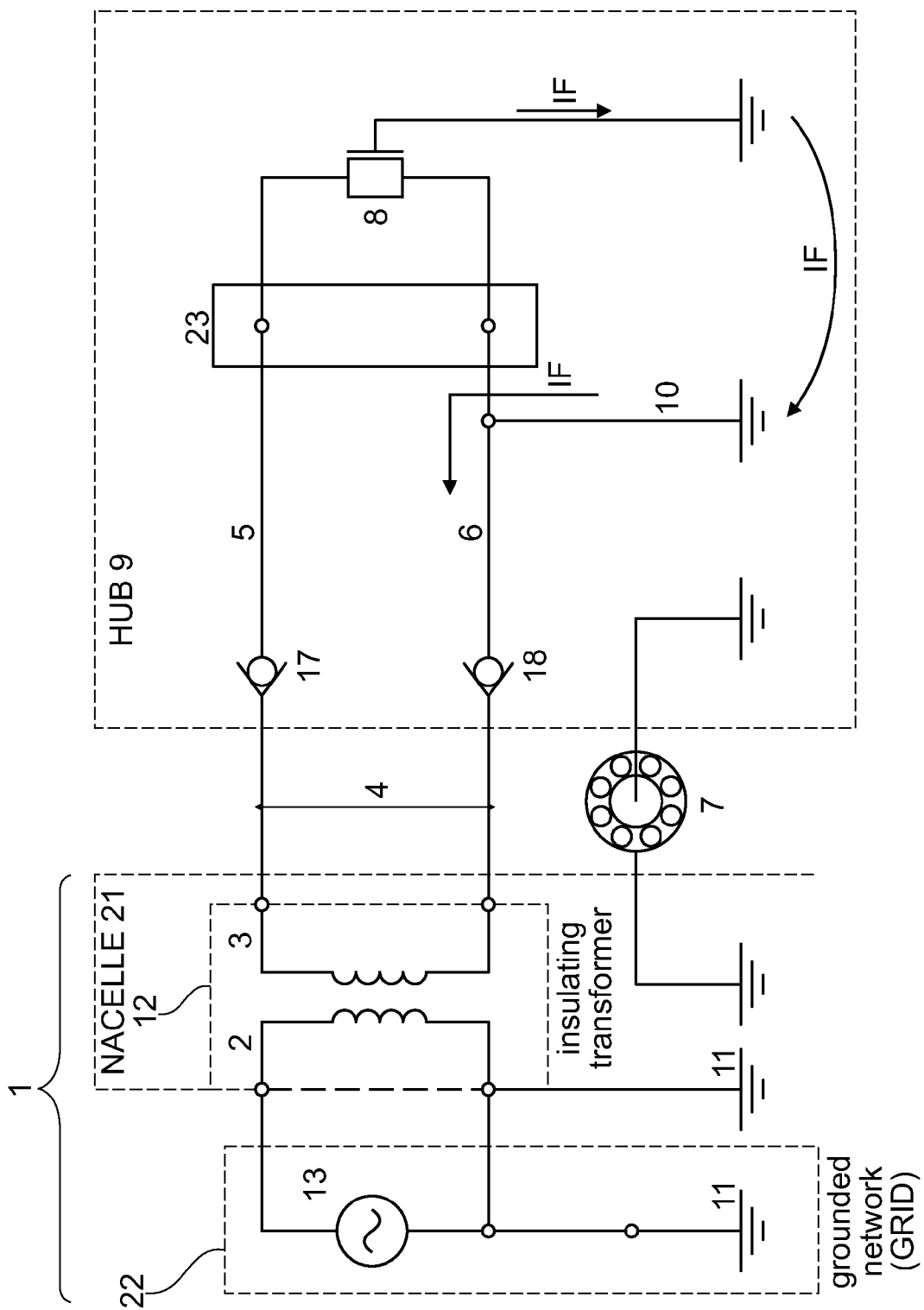
FIG. 1 shows a simplified schematic of an embodiment of the invention.

FIG. 1 shows a simplified schematic of an embodiment of the invention. There is a power source 13 and insulating transformer 12. The insulating transformer 12 alone, or in combination with the power source 13 are referred to as insulating power source 1. The power source 13 is grounded at a ground connection 11. The power source 13 can be an external power grid. The insulating transformer 12 has a primary side 2 and a secondary side 3. The primary side 2 is galvanic decoupled from the secondary side 3. The primary side 2 is coupled to the power source 13. An electrical conductor 4 is coupled to the secondary side of 3 of the insulating transformer 12. The electrical conductor 4 comprises two electrical conductors or cables 5 and 6. Sliding contacts 17 and 18 are provided for cables 5 and 6, respectively. This can be necessary for electrically coupling rotating and non rotating parts of a wind power plant by conductor 4. The electrical conductor 4 bypasses a stray current sensitive mechanical device 7. This stray current sensitive mechanical device may be a bearing, and more specifically the bearing of a hub 9 in this embodiment. An electrical load 8 is arranged at a second side of the stray current sensitive mechanical device 7. The second side is located in the hub 9 of the wind power plant. The electrical load 8 can be one ore more pitch drives for driving the blades of the wind power plant. One of the electrical conductors (in this example electrical conductor 6) is connected to common ground 10 at the second side (second side is the rotating side, i.e. the hub 9). Furthermore, the primary side 2 of the insulating power source 1 is also connected to a common ground through a ground connection 11. The common ground nodes 10 and 11 have the same common ground potentials. This is the common ground to which the electrically conducting parts of the wind power plant are connected. The insulating power source 1 is located at a first side, which is the nacelle 21 of the wind power plant in this example.

A fault current IF may then flow from the electrical load 8 towards ground. Due to the arrangement of the insulating power source 1, the electrical load 8, cables 5 and 6, and ground connections 11 and 10, the fault current IF returns to the insulating power source 1 instead of flowing through the stray current sensitive device 7. Stray or fault currents only flow through the electrical conductor 4 (for example cable 6) and not through the stray current sensitive device 7 Furthermore, the fault current IF does not return to the electrical load 8. The fault current IF flows back to the insulating power source 1, or more specifically, the fault current IF flows back to the secondary side of transformer 12 through the conductor 6. In other words, in this embodiment of the invention, the current circuit is closed. In case of a complete short circuit at the electrical load 8, the current should trip an over current protection device (not shown) that can be arranged in line with conductor 5.

In order to detect and avoid non-complete short circuit situations in which the current fails to trip the over current protection device a fault current detector 23 (for example a residual-current-operated protective device [abbr.: RCD]) can be arranged between the ground connection 10 of conductor 6 and the load 8.

In a slightly modified embodiment, the insulating power source 1 may be an insulating DC power supply pack. The voltage at the secondary side 3 is then a rectified DC voltage (rectifier not sown in FIG. 1). The cables 5 and 6 may then supply +24 V DC (cable 5) and the corresponding 24 V DC GND (cable 6). The cables 5 and 6 are coupled through sliding contacts into the hub 9. Only within the hub 9, cable 6 (the 24 V DC GND) is coupled to ground. The fault currents only return through cable 6 (24 V DC GND connection) to the insulating power source 1, and more specifically to the secondary side of the insulating transformer 12.

Figure 2:
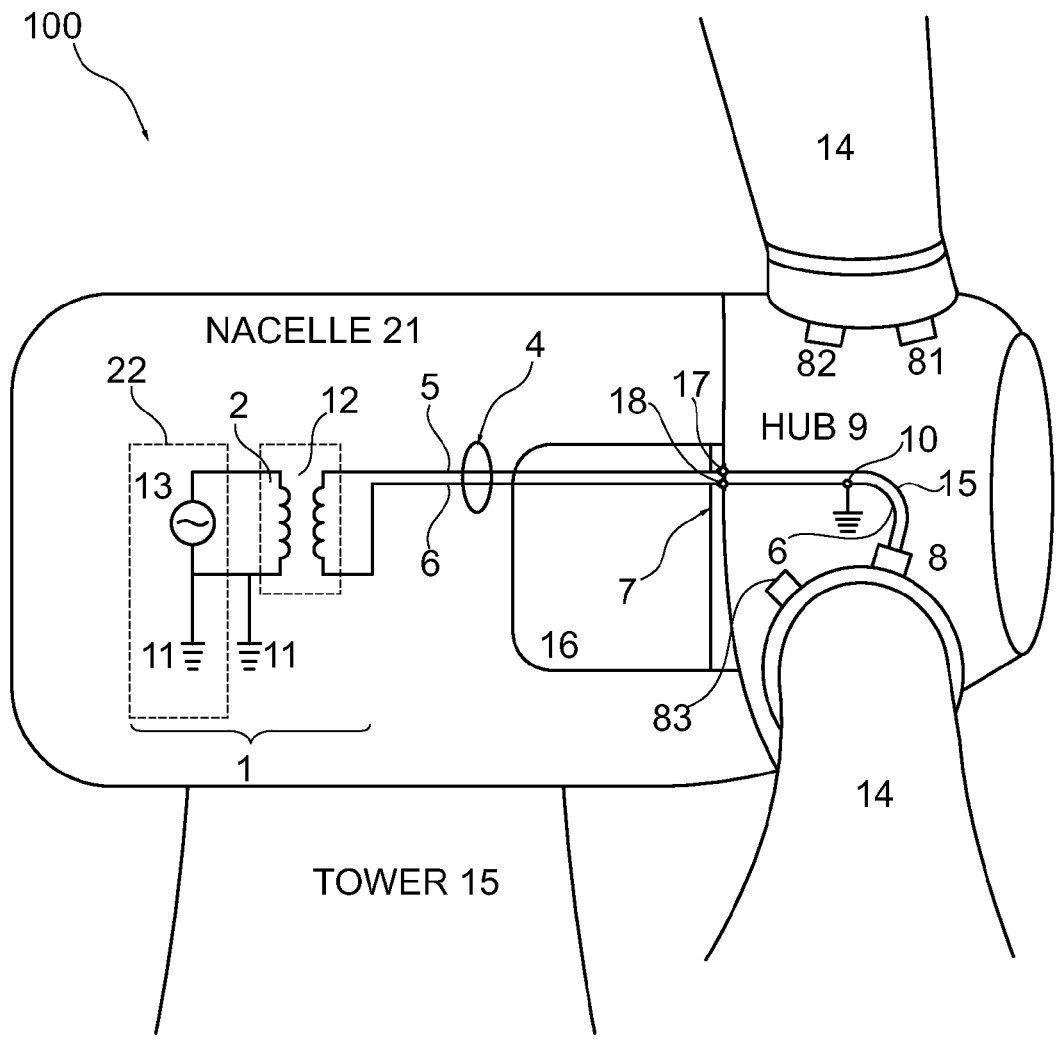
FIG. 2 shows a cross-sectional view of a wind power plant being equipped with an arrangement according to aspects of the invention.

FIG. 2 shows a cross-sectional view of a wind power plant 100 being arranged and equipped in accordance with aspects of the invention. The wind power plant 100 has a nacelle 11 mounted on a tower 15, a hub 9 and blades 14, which are coupled to the hub 9. The blades 14 can be rotated around their central axes in order to adjust the pitch of the blades 14. Some pitch drives 8, 81, 82, 83 are shown, which are configured to perform the pitch adjustment of the blades. The pitch drives 8, 81, 82, 83 are electric motors. They represent the electrical load for the power source 1. The power source 1 is an insulating power source which includes an AC power source 13, an insulating transformer 12 and a rectifier (not shown). A 24 V DC voltage is then provided at the output OUT of the insulating power source 1. This supply voltage is fed to one of the pitch drives 8, 81, 82, 83.

Pitch drive 8 is just an example, for all pitch drives 8, 81, 82, 83 that can be coupled and supplied in similar manner as pitch drive 8. There may be more pitch drives than shown in FIG. 2. The cables 5 and 6 are coupled to the output of the insulating power source 1. The primary side of the insulating power source is coupled to ground 11. This ground potential is the common ground potential of the electrically conducting parts of the nacelle. The power for the insulating power source can be supplied by an external power grid or external power network as indicated by reference number 22 in FIG. 1. The connection to the power grid or power network is represented by power source 13 and ground connection 11. The conductors 5, 6 are coupled through the bearing 7 of the hub by sliding contacts 17, 18. Inside the hub 9, the cables 5, 6 are coupled to pitch drive 8. There is a ground connection 10, to which cable 6 (ground, the secondary side of the insulating power source) is connected. The potential of the ground connection 10, is the common ground potential of all electrically conducting parts of the hub 9.

One of the major advantages of this embodiment of the invention resides in the location of the insulating power source 1. In particular, the insulating transformer 12 can remain in the nacelle and is therefore not subject to rotation and allows improved access during maintenance.

Although the invention has been described hereinabove with reference to specific embodiments, it is not limited to these embodiments and no doubt further alternatives will occur to the skilled person that lie within the scope of the invention as claimed.

The invention claimed is:

1. An arrangement for avoiding stray currents in a wind power plant, comprising:
    an insulating power source having a galvanic decoupled secondary side;
    an electrical load coupled to the galvanic decoupled secondary side of the insulating power source through an electrical conductor; and
    a stray current sensitive mechanical component connecting a first location and a second location of the wind power plant;
    wherein the insulating power source being located in the first location of the wind power plant and the electrical load being located in the second location of the wind power plant, the first location and the second location being at opposite sides of the stray current sensitive mechanical component of the wind power plant;
    wherein the electrical conductor bypasses the stray current sensitive mechanical component and is coupled to a common ground potential in the second location of the wind power plant.

2. The arrangement according to claim 1, wherein the insulating power source has a primary side being galvanic decoupled from the galvanic decoupled secondary side, and wherein the primary side is connected to a common ground potential in the first location of the wind power plant.

3. The arrangement according to claim 2, wherein the first location is a nacelle of the wind power plant and the second location is a hub of the wind power plant.

4. The arrangement according to claim 3, wherein the electrical load is a pitch drive for adjusting the pitch of a blade of the wind power plant, and the stray current sensitive mechanical component is a bearing of the wind power plant.

5. A wind power plant comprising the arrangement according to claim 1.

6. A wind park comprising wind power plants according to claim 5.

7. A method for avoiding stray currents in a wind power plant, the method comprising the steps of:
    arranging an insulating power source having a primary side and a galvanic decoupled secondary side in a first location of the wind power plant;
    arranging an electrical load in a second location of the wind power plant, the first and the second location being at opposite sides of a stray current sensitive mechanical component of the wind power plant;
    connecting the galvanic decoupled secondary side of the insulating power source through an electrical conductor to the electrical load; and
    connecting the electrical conductor to a common ground potential in the second location of the wind power plant and bypassing the stray current sensitive mechanical component;
    wherein the stray current sensitive mechanical component is connecting the first location and the second location of the wind power plant.

8. A method according to claim 7, further comprising: connecting the primary side of the insulating power source to a common ground potential in the first location of the wind power plant;
    wherein the first location is a nacelle of the wind power plant and the second location is a hub of the wind power plant.

* * * * *